United States Patent [19]
Hansen

[11] Patent Number: 6,128,852
[45] Date of Patent: Oct. 10, 2000

[54] LANDSCAPING TARP FOR COVERING STONES OR WOOD CHIPS ABOUT TREE OR BUSH

[76] Inventor: Merrill J. Hansen, 2800 Hillsboro Ave. North Unit 219, New Hope, Minn. 55427

[21] Appl. No.: 09/294,975

[22] Filed: Apr. 19, 1999

[51] Int. Cl.[7] .............................. A01G 17/00; A01G 3/04
[52] U.S. Cl. ................. 47/25; 47/23; 47/1.01 R
[58] Field of Search ....................... 47/9, 23, 25, 1.01 R; 56/329, 328.1

[56] References Cited

U.S. PATENT DOCUMENTS

| | | | |
|---|---|---|---|
| 606,682 | 7/1898 | Pearce et al. | 56/329 |
| 853,833 | 5/1907 | Saum, Jr. | 56/329 |
| 1,256,890 | 2/1918 | Flinn | 56/329 |
| 1,931,602 | 10/1933 | Colman | 47/25 |
| 2,519,678 | 8/1950 | MacKenzie | 56/329 |
| 3,490,216 | 1/1970 | Gonzalez | 56/329 |
| 4,058,956 | 11/1977 | Skonieczny | 47/25 X |
| 5,117,582 | 6/1992 | Cissel, Jr. et al. | 47/25 |
| 5,184,421 | 2/1993 | Meharg | 47/25 X |
| 5,361,536 | 11/1994 | Myer | 47/25 X |
| 5,502,921 | 4/1996 | Hyslop | 47/25 |
| 5,509,231 | 4/1996 | Marcoux | 47/25 X |
| 5,744,212 | 4/1998 | Meeks | 56/329 X |

FOREIGN PATENT DOCUMENTS 2 660 833  10/1991  France ........................ 47/25

*Primary Examiner*—Michael J. Carone
*Assistant Examiner*—Jeffrey L. Gellner

[57] ABSTRACT

A landscaping tarp for being positioned about an object such as a bush or small tree set in a bed of rocks, stones or wood chips. The tarp covers the rocks, stones or wood chips about the bush or small tree such that, when the bush or small tree is trimmed, the cut leaves and twigs fall on the landscaping tarp instead of onto and into the bed of rocks, stones or wood chips, out of which it is difficult to rake leaves and twigs and out of which it is tedious and laborious to pick out the leaves and twigs by hand. The tarp includes a first opening that is positioned about the bush or small tree. The first opening is resiliently biased to a closed position to fit snugly when shaped about the base of the bush or small tree. When the tarp is removed from the base, the first opening is drawn shut by overlapping two half portions and attaching quick connectors to each other to prevent the cut leaves and twigs which are gathered in the tarp from falling through the first opening. The first opening is located in a generally central area of the tarp and leads into a second opening which in turns opens up at the perimeter of the tarp so as to form a slot from the perimeter to the first opening and so as to permit the tarp to be slid onto the base of the bush or small tree. The tarp further includes a flap to close off the second opening after the tarp has been positioned about the bush or small tree. The flap may further be closed after the tarp has been slid away from the bush or small tree and prior to gathering up the tarp so as to collect the cut leaves and twigs therein.

19 Claims, 6 Drawing Sheets

LANDSCAPING TARP FOR COVERING STONES OR WOOD CHIPS ABOUT TREE OR BUSH

BACKGROUND OF THE INVENTION

The present invention relates generally to landscaping, particularly to landscaping trees and bushes, and specifically to landscaping trees or bushes set in a bed of rocks or wood chips.

A bed of rocks, stones or wood chips set about a bush or small tree is both functional and aesthetic. The bed is functional because it minimizes the growth of weeds and grass about the shrubbery. The bed is also considered to be aesthetic, and the rocks, stones or wood chips in the bed may be of different sizes, shapes and colors in the nature of a rock garden.

The bed causes problems when the bush or other such shrubbery is to be trimmed. Leaves, branches and small twigs fall onto and into the rocks, stones or wood chips. Raking the leaves and small twigs out of the rocks, stones or wood chips is difficult because a light pressure on the rake draws out only a few of the leaves and twigs and because a heavy pressure on the rake draws out rocks, stones or wood chips with the leaves and twigs. Picking the leaves and small twigs out of the rocks, stones or wood chips by hand is time consuming. Leaving the leaves and small twigs where they fall detracts from the aesthetic quality of the landscaping about the shrubbery and causes a functional problem: a decomposition of the leaves and small twigs into compost and a growth of weeds in the compost above the layer of plastic which often underlies the landscaped area. Blowing the leaves and twigs out of the rocks, stones or wood chips is one option, but blowers scatter the relatively light wood chips beyond the landscaped area to the sidewalk, driveway or lawn. Blowers are also loud and polluting internal combustion machines that are expensive to buy, operate and maintain. Vacuuming the leaves and twigs out of the rocks, stones or wood chips is another option, but the relative lightness of the wood chips draws wood chips into the vacuum.

SUMMARY OF THE INVENTION

A general object of the present invention is to provide a tarp which is uniquely constructed for landscaping.

Another object of the invention is to provide a landscaping tarp that uniquely includes a first opening that resiliently fits snugly about the base of a bush or small tree and that resiliently closes when removed from the base of a bush or small tree so that the tarp may operate like a bag for holding the cut leaves and small twigs to be carried off and dumped elsewhere.

Another object of the invention is to provide a landscaping tarp that uniquely is two piece. A first piece defines a generally central area and includes the first opening which is resiliently openable and closeable. A second piece is stitched to the perimeter of the first piece and extends radially outward and includes the perimeter of the tarp as a whole. The first piece is extendable and retractable relative to the second piece and such a feature is provided by providing gathered, excess material for the first piece such that the first opening for the first piece may open and close in a resilient fashion.

Another object of the present invention is to uniquely provide an overlap to the resilient first opening in the generally central area to minimize the amount of cut leaves and twigs that may fall through the first opening when closed and/or when the tarp is being used as a bag.

Another object of the present invention is to uniquely provide quick connectors to close off half sections of the generally central area to minimize or eliminate the amount of cut leaves and twigs that may fall through the first opening when closed and/or when the tarp is being used as a bag.

Another object of the present invention is to uniquely provide a second opening in the landscaping tarp. The second opening is formed in the second piece of sheeting and extends from the first opening to the perimeter of the second piece of sheeting. The second opening is open at the perimeter such that the tarp may be slid onto the base of a bush or small tree to locate the base in the first opening at the generally central area of the tarp.

Another object of the present invention is to uniquely provide a flap to the second opening so as to close off the second opening and minimize the number of cut leaves and twigs falling through the second opening when the tarp is laid flat and when the tarp is being used as a bag.

Another object of the present invention is to uniquely provide quick connectors to the flap over the second opening so that the tarp can be quickly set in place about a bush or small tree and quickly removed from the bush or small tree.

Another object of the present invention is to uniquely fashion both the first and second pieces of sheeting out of a polymeric or copolymeric material so as to provide a relatively slippery surface to the tarp. Such a slippery surface texture to the tarp aids in the removal, such as by raking, hand pushing or dumping, of the cut leaves and twigs off the tarp.

An advantage of the present invention is landscaping efficiency. It is quicker and easier to clean up after bushes and small trees set in a bed of rocks, stones or wood chips have been trimmed.

Another advantage of the present invention is cost. The tarp is inexpensive, especially compared to an internal combustion leaf blowing machine. Further, the tarp is inexpensive to manufacture.

Another advantage of the present invention is simplicity. The tarp is easy to use.

Another advantage of the present invention is multiple functionality. The tarp may be used for its intended use in landscaping, but also used as a bag or for any other purpose for which a tarp may be put to use.

These and further objects and advantages of the present invention will become clearer in light of the following detailed description of the illustrative embodiments of this invention described in connection with the drawings.

BRIEF DESCRIPTION OF THE DRAWINGS

The illustrative embodiments may be best described by reference to the accompanying drawings where.

DESCRIPTION

Figure 1:
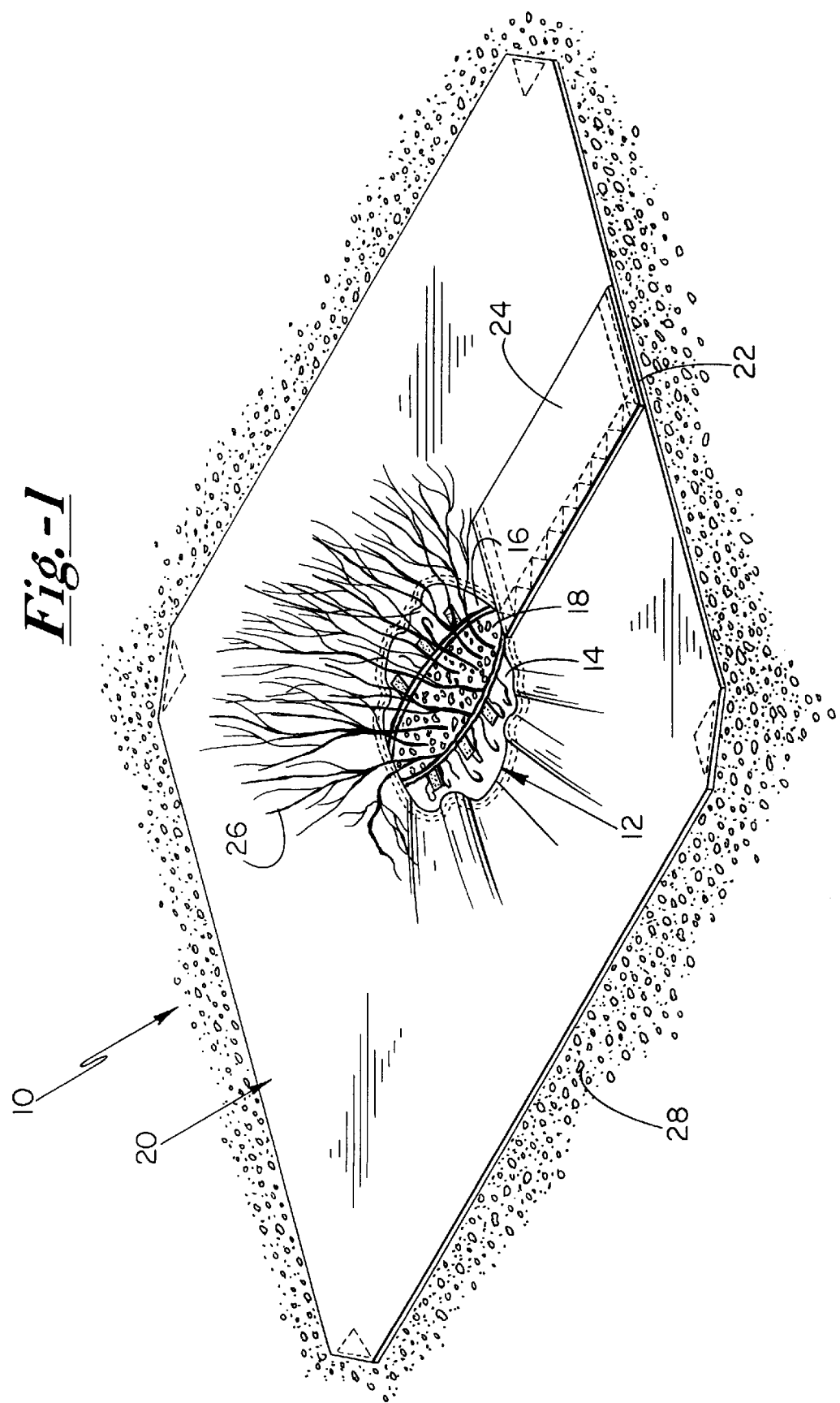
FIG. 1 is a perspective view of the landscaping tarp about the base of a bush.

As shown in FIG. 1, the present landscaping tarp is generally indicated by reference numeral 10. The landscaping tarp 10 generally includes a central sheeting portion 12 that includes two sheeting sections or halves 14 and 16 forming a first opening or slot 18, a main or outer sheeting portion 20 forming a second opening or slot 22, and a flap 24 extending over the second opening 22. The landscaping tarp 10 is positioned about a bush 26 with the base of the bush 26 being located in the first opening 18. In such a position, the tarp 10 may cover a bed of rocks, stones or wood chips 28 and catch leaves and twigs being cut from the bush 26. The tarp 10 is slid onto and off of the base of the bush 26 via the second opening 22 and first opening 18 which lead into each other.

Figure 2:
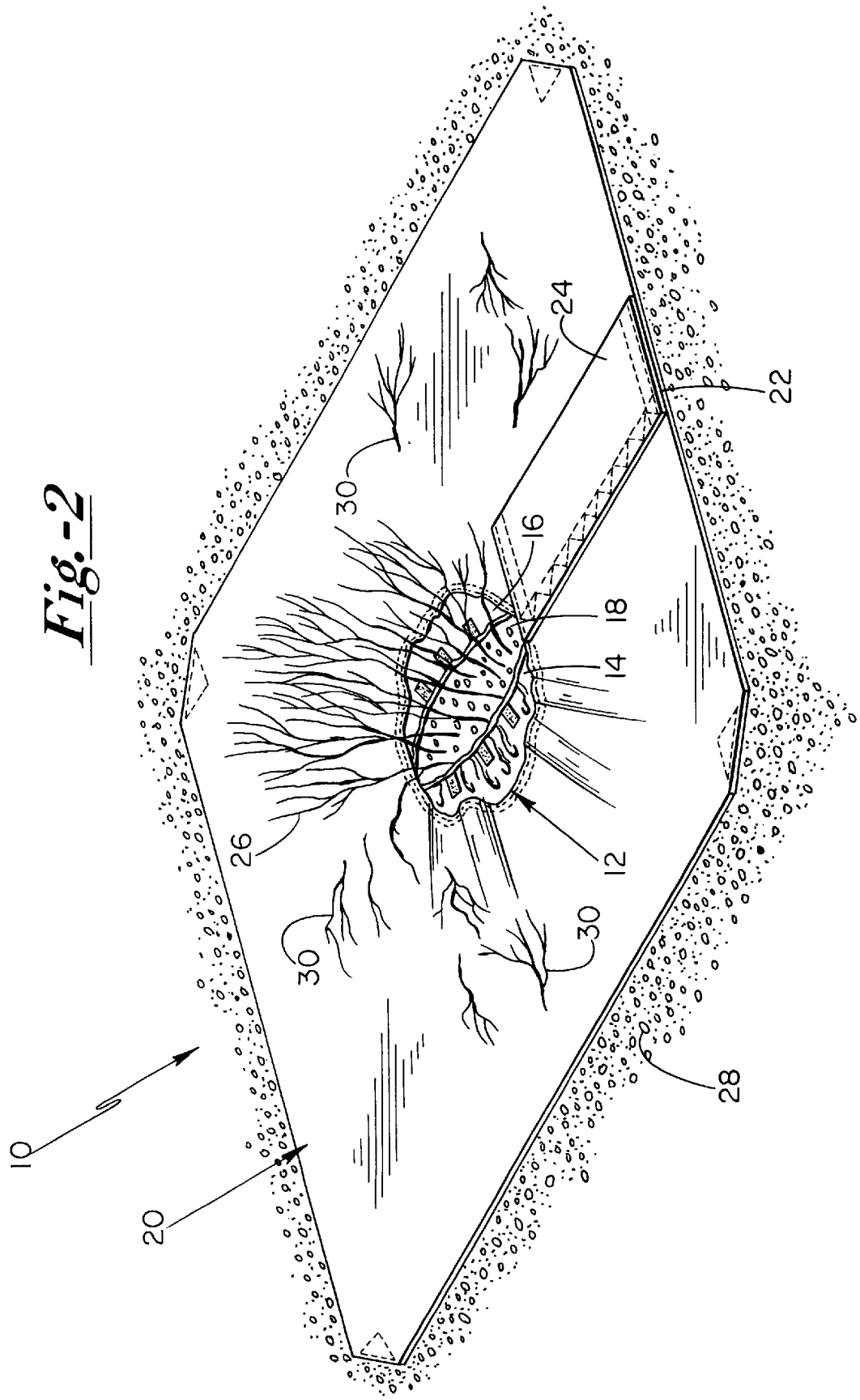
FIG. 2 is a perspective view of the landscaping tarp of FIG. 1 after the bush has been trimmed and shows cut twigs on the tarp.

FIG. 2 shows cut twigs 30 cut from the bush 26. Twigs 30 lie on the landscaping tarp 10, ready to be raked off of, pushed from, or picked up from the tarp 10. Alternatively, the cut twigs 30 or cut leaves may be left on the tarp 10 (but the cut leaves and twigs brushed away from half portions 14 and 16), the flap 24 may be opened to open up the second opening 22 (an action which spills the cut leaves and twigs from the flap 24 to other portions of the tarp 10), the tarp 10 then may be pulled off the base of the bush 26, the flap 24 refastened and the first opening 18 closed, and the tarp 10 bundled into the form of a bag trapping the cut twigs 30 or cut leaves inside.

Figure 3:
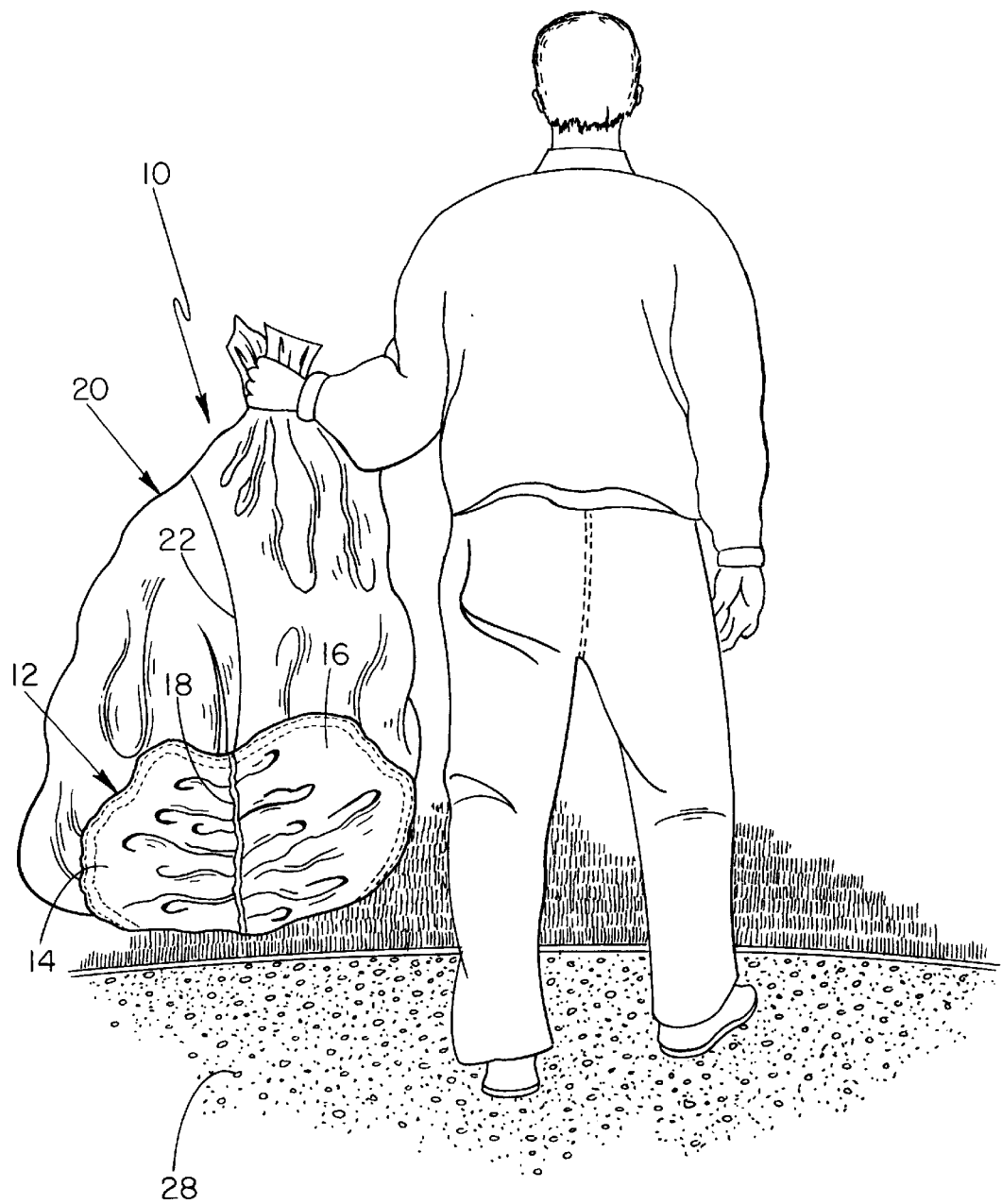
FIG. 3 shows the landscaping tarp of FIGS. 1 and 2 being used as a bag to carry off cut leaves and twigs, shows the closed, first opening of the central area of the tarp, and shows the closed, second opening of the main tarp portion.

FIG. 3 shows the landscaping tarp 10 in the form of a bag with cut twigs 30 or cut leaves inside for being dumped elsewhere such as in a compost heap or garbage can. The underside of the tarp 10 is shown in FIG. 3, which shows the first opening 18 leading into the second opening 22, with both of the openings 18 and 22 being closed with Velcro® or Velcro® like hook and loop closures.

Figure 4:
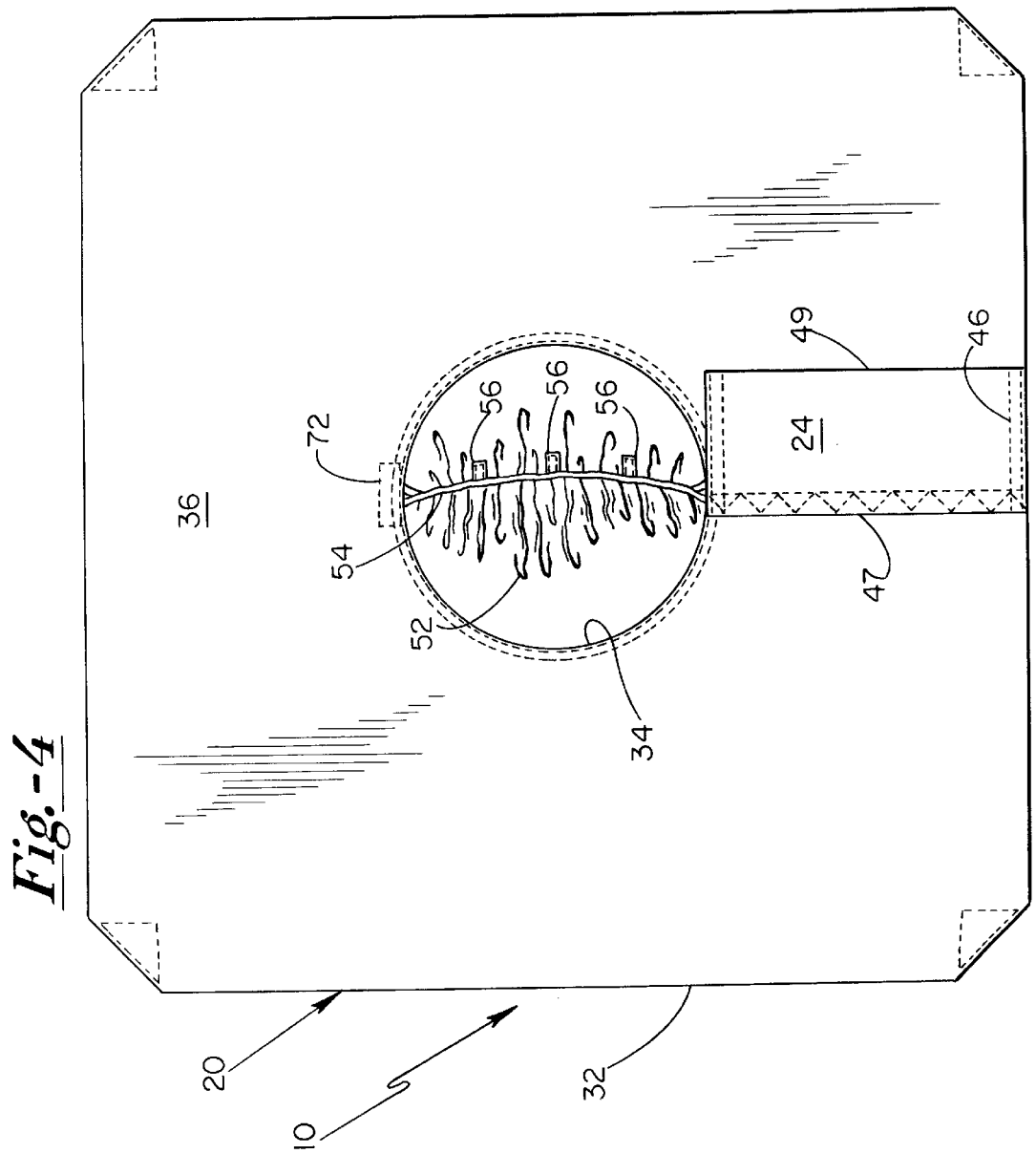
FIG. 4 is a top view of the landscaping tarp of FIG. 1, shows how the opening of the central area may be overlapped and closed off, and further shows a flap for a second opening extending from the central area to the perimeter of the tarp.
Figure 5:
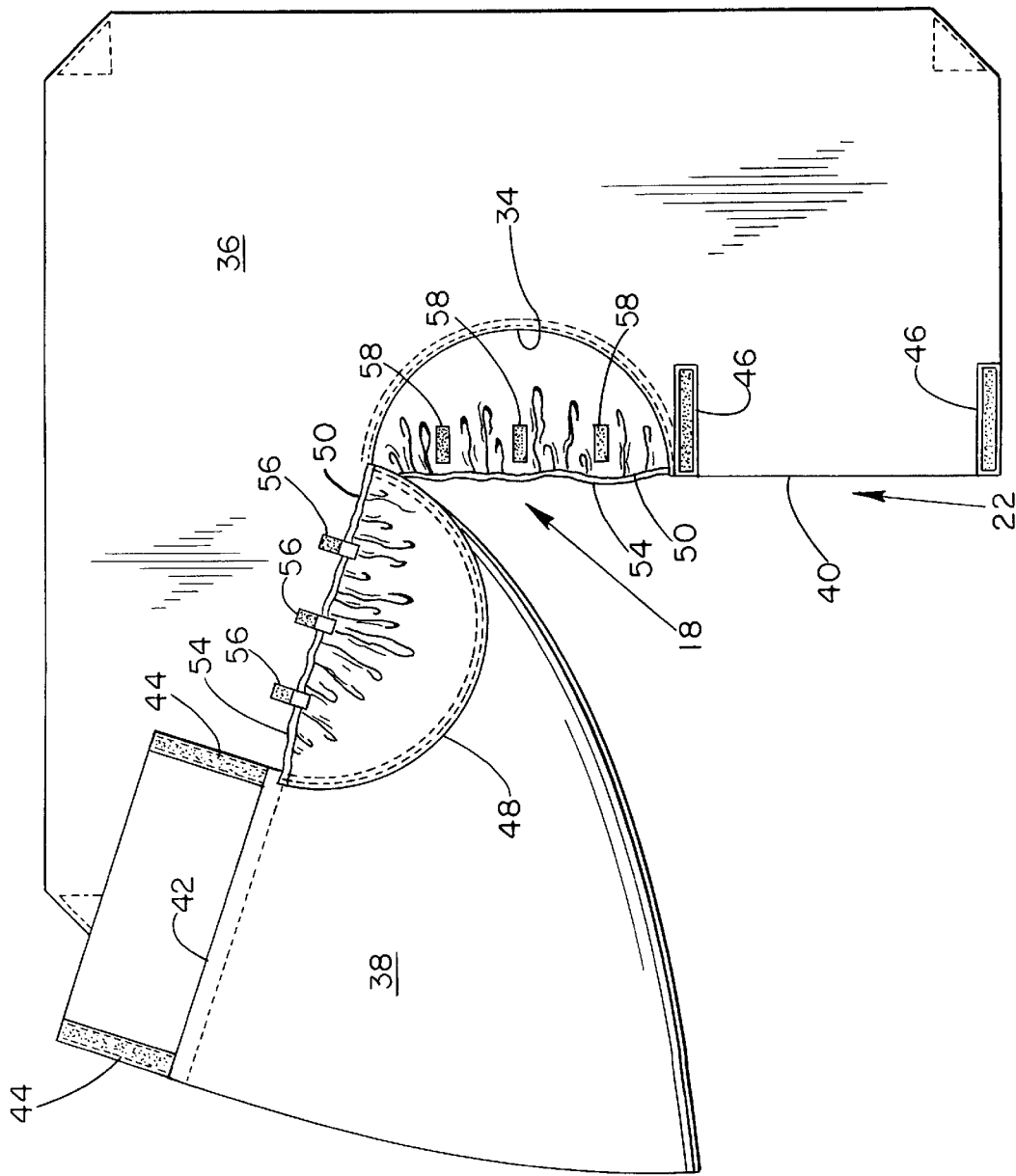
FIG. 5 is a top view of the landscaping tarp of FIG. 1 with a portion of the tarp lifted away to show how the second opening leads into the opening in the central area.

More specifically, as shown in FIGS. 4 and 5, the main portion 20 of the tarp 10 includes a square or somewhat rectangular perimeter 32 and an inner circular edge 34. Main portion 20 further includes an upper side 36 and an underside 38. Main portion 20 further includes an inner slot forming edge 40 and an opposing slot forming edge 42. Slot forming edges 40, 42 form the second opening or slot 18. Main portion 20 is a flexible sheeting material and is preferably canvas or plastic. If canvas, main portion 20 is preferably coated, such as with silicone, so as to be water resistant and more preferably waterproof, and this silicone further provides the preferred slippery texture. More preferably, main portion 20 is plastic so as to provide an integral slippery surface or slippery texture to each of the upper side 36 and underside 38. Most preferably, main portion 20 is polyethylene. The slippery texture permits cut leaves and twigs to be easily gathered from or dumped off of the tarp 10.

Flap 24 is stitched to main portion 20 along slot forming edge 42 from perimeter 32 to inner circular edge 34. Flap 24 is a sheeting material and is formed preferably of the same material as main portion 20. Flap 24 includes a pair of quick connector strips 44 for engagement with another pair of quick connector strips 46 extending transversely from the other slot forming edge 40 and being stitched to main portion 20. One strip 46 is stitched along perimeter 32 and the other strip 46 runs tangentially to the inner circular edge 34. It should be noted that flap 24 may be engaged to the strips 46 such that slot forming edges 40, 42 confront each other without overlapping (and where the flap 24 alone closes off slot 18), or strips 44 may engage strips 46 such that edges 40, 42 overlap (and where flap 24 and edges 40, 42 close off opening 18). One pair of strips 44 may be hook connectors (such as Velcro® hook connectors). The other pair of strips 46 may be loop connectors (such as Velcro® loop connectors). If desired, other quick connectors may be used such as snaps. Flap 24 includes a hinged edge 47 and an opposing parallel edge 49. The length of flap 24 is the same as the length of slot 22.

It should be noted that Velcro® loop and hook connectors such as strips 44 and 46 may be fixed along the opposing parallel edge 49 (or at right angles thereto) and its respective confronting section on the main tarp portion 20. It should further be noted that, instead of elongate Velcro® loop and hook connector strips, strips 44 and 46 may be shorter, such as square shaped, and be placed at the corners of the flap 24 on parallel edge 49 and/or at other locations about the perimeter of flap 24.

As noted above, central sheeting portion 12 includes two sheeting sections or halves 14 and 16. Each half 14, 16 is generally hemispherically shaped and includes an outer circular perimeter edge 48 and an inner slot forming edge 50. Each half 14, 16 is double stitched along each of the edges 48 and 50. Each half 14, 16 is preferably formed of a canvas or plastic. If canvas, the canvas preferably includes a water resistant or waterproof coating such as silicone. More preferably, each of the halves 14, 16 is plastic, most preferably nylon, with the nylon having a slippery surface texture. Such a slippery surface texture may be provided by coating the surfaces of the halves 14, 16 with a polymer or copolymer that renders the nylon waterproof and that further provides strength to the nylon. One preferred polymer or plastic coating that is slippery, provides a waterproofing to the nylon, and gives a greater degree of strength to the nylon is polyvinylchloride.

Each of the halves 14, 16 is preferably extendable or expandable and retractable relative to the main portion 20 of the tarp 10. In other words, as shown by the folds 52, each of the halves 14, 16 is gathered so that the halves 14, 16 can extend or expand about the base of a bush 26 or small tree and then retract so as to close off the slot or first opening 18. To aid in such a retraction, an elastic strip 54 is stitched along or in each of the edges 50, and this elastic or resilient strip 54 extends about the base of the bush 26 or small tree and then resiliently retracts itself to a generally linear configuration such that the edges 50 confront each other to close off the opening 18.

To further close off opening 18, a set of quick connector strips 56 (such as three) are stitched to and extend from one of the edges 50 of one of the halves 14 or 16 so as to engage another set of quick connector strips 58 fixed to one of the faces of the other half 14 or 16. Strips 58 are elongate so as to adjust the tightness of the halves 14 and 16 relative to each other. One of the set of strips 56, 58 may be hook connectors (such as Velcro® hook connectors) and the other of the set of strips 56, 58 may be loop connectors (such as Velcro® loop connectors).

It should be noted that while central sheeting 12 may be extendable and retractable, main tarp portion 20 lies relatively flat. Halves 14, 16 may be drawn relatively tightly, yet tarp portion 20 remains flat. Double stitching about the inner perimeter 34 is an isolation barrier between the extendable and retractable central sheeting or area 12 and main tarp portion 20.

It should further be noted that elastic strips 54 and edges 50 may be retractable to the hemispherical edges 48 (i.e. the inner perimeter 34). Tarp 10 thus fits any bush having a base which has a diameter about equal to or less than the diameter of inner perimeter 34.

Figure 6:
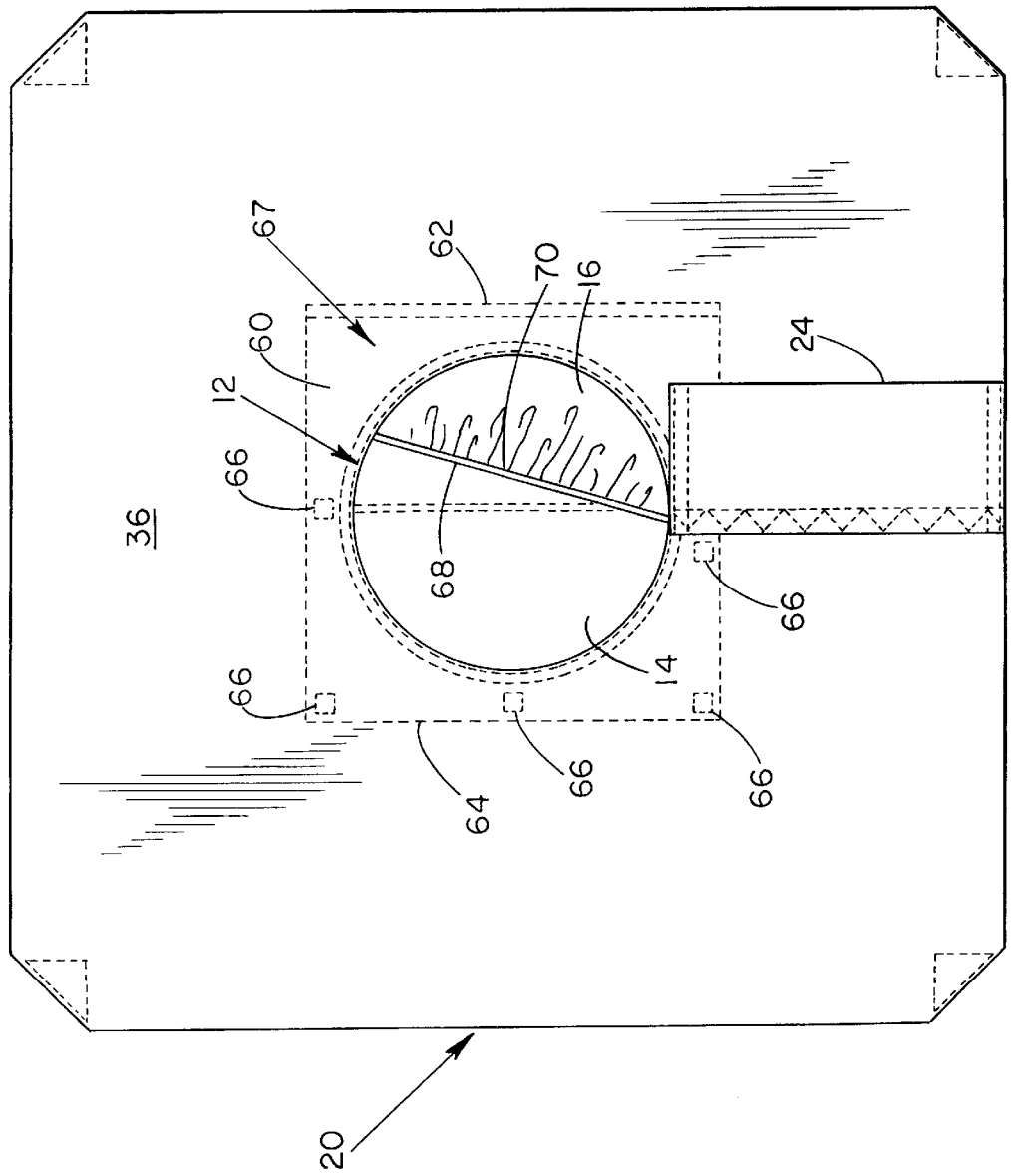
FIG. 6 is a top view of another embodiment of the landscaping tarp of FIG. 1 where the first opening is closed off by an oblique closure.

FIG. 6 shows alternate embodiments of tarp 10. For example, a second flap 60 may be stitched to main tarp portion 20 along one flap edge 62 and be releasably secured along another tarp edge 64 via sets of hook and loop connector strips 66 stitched respectively to the flap edge 64 and upper side 36 of the main tarp portion 20. Such second flap 60 includes a width and length greater than the diameter of the central area 12 such that the halves 14 and 16 may be eliminated. Such second flap 60 further preferably extends at least partially over first flap 24. Still more preferably, one of the flaps 24, 60 quick connects on one side of the openings 18 and 22 and the other of the flaps 24, 60 quick connects on the other side of the openings 18 and 22.

In the embodiment where the halves 14 and 16 are eliminated and where the second flap 60 covers the generally central area that receives the base of the bush, it should be noted that edges 40 and 42 may crisscross each other so as to draw as much of the main tarp portion 20 as possible about the base of the plant. Such crisscrossing portions are then connected by the quick connectors 44, 46 which are closest to the plant. When the trimming operation is complete, the trimmings are pushed or brushed off of the surfaces of the tarp 10 that confront the flaps 24 and 60 when they are closed so that the flaps 24 and 60 may be closed. The flaps 24 and 60 are then secured with their respective quick connectors. The four corners of the tarp 10 may then be picked up, with the tarp 10 being drawn into a bag like form, carried, and emptied elsewhere.

Another embodiment of tarp 10 includes a type of overlap or closure 67 for opening 18 that does not require quick connector strips such as hook and loop connectors or snaps. Closure 67 provides for at least one oblique edge 68, replacing edge 50. Edge 68 includes an oblique elastic or resilient strip 70 such that the halves 14 and 16 overlap one another as stitched. Half 14 in such an embodiment no longer is neatly hemispherical. However, if desired, each of the halves 14 and 16 may form an arc only slightly greater than 180 degrees so as to provide for an overlap without the use of quick connectors. Resilient strip 70 has sufficient stretch therein to wind about the base of the bush 26 or small tree as the opening 18 is relatively slid onto the base of the bush 26 or small tree. Opening 18 is thereby a tortuous opening, minimizing the chances of cut twigs or leaves from making their way through such a tortuous opening.

It should be noted that certain portions of the tarp 10 may be doubled over and/or double stitched to provide for a more durable, reinforced tarp. For example, it is preferred that edges 50 be doubled over. Elastic strips 54 may be engaged inside of the material so doubled over. Hinge edges 47 and 62 of respective flaps 24 and 60 are double stitched. Outer perimeter 32 preferably includes a double thickness of sheeting. The perimeters of the flaps 24 and 60 preferably include a double thickness of sheeting. Further, a location noted by reference numeral 72 includes a double or triple or quadruple thickness of sheeting to minimize the chances of a rip where opening 18 meets the main tarp portion 20. The areas of double thickness may heat sealed or sewn.

It should be noted that edges of the tarp 10 may have a rope (such as a polymer roping or plastic rope) sealed in a hem to add to the tarp's durability. These edges include one or more of the outer perimeter 32, the inner circular edge 34, the edges of the flaps 24 and 60, and the resilient edges 50.

Main tarp portion 20 may be relatively less expensive and less flexible than the sheeting which forms central area 12. The sheeting that forms central area 12 may be relatively more flexible and more expensive than main tarp portion 20. This maximizes the use of the inexpensive material.

Main tarp portion 20 and central area 12 preferably have different graphic characteristics. For example, main tarp portion 20 and central area 12 may be of different colors or different shades of colors or have different patterns. This use of different graphics aids in teaching the customer or first time user how the tarp works.

An alternative quick connector to Velcro® or Velcro® like hook and loop connectors or snaps is a zipper.

It should be further noted that the tarp 10 is mildew resistant. As noted above, the most preferred material for the tarp 10, including the main tarp portion 20 and the central area 12, is plastic. Preferably the main tarp portion 20 is polyethylene and the central area 12 is nylon with a coating of polyvinylchloride on either side.

In operation, prior to trimming, the tarp 10 is unrolled or unfolded and then laid flat adjacent to the bush 26 or small tree to be trimmed such that opening 22 lies adjacent to the bush 26 or small tree. Then flap 24 is opened or at least partially opened so as to expose opening 22 or to partially expose opening 22. Quick connectors 56, 58 are opened so as to permit opening 18 to be accessed. Then the tarp 10 is grabbed by the perimeter adjacent to flap 24 and the tarp 10 is slid about the base of the bush 26 or small tree until the base of the bush 26 or small tree is in the central opening 18. With the provision of the elastic or resilient strips 54, the opening 18 partially closes itself off. However, given the irregularity of bushes and small trees, it is desirable to try to work the opening 18 closed. If the base of the bush or tree is small, one or more of the quick connectors 56 and 58 may be closed. Main tarp portion 20 is smoothed out so as to be flat and flap 24 is closed. The inner edge of flap 24 may be drawn snugly about a portion of the base of the bush or plant and the quick connectors 44 and 46 attached. Then the bush 26 or small tree is trimmed, with the leaves, twigs and branches falling on the tarp 10 (including the half portions 14 and 16 and the main tarp portion 20) instead of the bed of stones, rocks or wood chips. Then 1) the cut leaves, twigs or branches may be raked or pushed off of the tarp, 2) openings 18 and 22 opened up, and 3) the tarp 10 is pulled from the perimeter opposite of the flap 24 so as to be pulled away from the base of the bush 26 or small tree. Alternatively 1) the cut leaves, twigs or branches may be left where they fall on the tarp 10 (such as on half portions 14 and 16 or main tarp portion 20), 2) openings 18 and 22 carefully opened up by brushing or pushing the cut leaves, twigs or branches away from the openings 18 and 22, 3) the tarp 10 is pulled from the perimeter opposite the flap 24 so as to be pulled away from the base of the bush 26 or small tree, 4) halves 14 and 16 are overlapped, 5) openings 18 and 22 are closed, and 6) the tarp 10 is bundled into the shape of a bag, trapping the cut leaves, twigs and branches inside for being dumped elsewhere.

It should be noted that the leaves and cut twigs 30 also fall on the tarp 10 adjacent to the opening 18. Prior to closing the opening 18, such leaves and cut twigs 30 are preferably brushed away from the opening 18 such as to the edge of the circle (outer circular perimeter edge 48) prior to fastening the halves 14 and 16 to each other with the quick connectors 56, 58.

It should be noted that opening 18 substantially closes itself off with the elastic strips 54 when the elastic strips 54 are stitched relatively tightly to the main tarp portion 20 so as to provide a lesser degree of expansion to the half portions 14 and 16. However, in some cases, it is preferable to include some slack in the elastic strips 54 so as to provide a greater degree of expansion to the half portions 14 and 16. Where such a resilient slackness is provided, the opening 18 partially draws itself closed and then is drawn fully closed by hand. Such a closure is enhanced by the quick connectors 56 and 58, which fixes the halves 14 and 16 to each other and permits a partial overlap of the halves 14 and 16 relative to each other. This overlaps minimizes or eliminates a spilling of the contents of the tarp 10 such as when the contents are dumped out.

It should be noted that the main tarp portion 20 may be of different sizes and shapes. Rectangular and generally square shapes are most preferred. Further, the central sheeting portion 12 may be of different sizes relative to the main tarp portion 20. Preferably, the central sheeting portion 12 has a width or diameter about one third of the length or width of the main tarp portion 20. Still further, the central sheeting portion 12 may have different shapes. A generally circular central sheeting portion 12 is preferred.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A landscaping tarp for landscaping an object set in an environment where collection of debris falling from the object is difficult, comprising, in combination:
   a) a piece of sheeting, with the piece of sheeting having a perimeter and a generally central area within the perimeter, with the sheeting being flexible such that the sheeting can lay flat and be gathered into a bag form;
   b) an opening in the generally central area, with the opening being openable and closeable;
   c) wherein the opening and piece of sheeting are positioned about the object such that the debris falling from the object falls on the tarp instead of onto the environment;
   d) wherein the piece of sheeting comprises first and second flexible sheeting portions, with the generally central area comprising the first sheeting portion, and with the second sheeting portion being between the first sheeting portion and the perimeter such that the second sheeting portion radiates outwardly planarly from the first sheeting portion when the sheeting lays flat;
   e) wherein the first sheeting portion is extendable and retractable relative to the second sheeting portion whereby the first sheeting portion may give when placed about the object while permitting the second sheeting portion to lay flat; and
   f) wherein, when disengaged from the object and when the opening is closed, the tarp may be gathered about the perimeter to place the tarp in a bag form to hold the debris therein.

2. The landscaping tarp according to claim 1, wherein the opening is resiliently biased toward a closed configuration to minimize debris falling through the opening when the tarp is positioned about the object and when the tarp has been disengaged from the object.

3. The landscaping tarp according to claim 2, wherein the generally central area comprises two first inner edges confronting each other and forming at least a portion of the opening, with the two first inner edges being resiliently biased toward each other to resiliently draw the opening toward the closed configuration to minimize debris falling through the opening when the tarp is positioned about the object and when the tarp has been disengaged from the object.

4. The landscaping tarp according to claim 3, wherein the two first inner edges overlap one another to further minimize debris falling through the opening when the tarp has been disengaged from the object.

5. The landscaping tarp according to claim 1, wherein the opening extends from the generally central area to the perimeter, and with the opening being open at the perimeter whereby the object may be relatively slid through the opening from the perimeter to the generally central area.

6. The landscaping tarp according to claim 5, wherein the piece of sheeting comprises a flap, with the flap being positioned between the generally central area and the perimeter, with the flap covering at least a section of the opening that extends from the generally central area to the perimeter to minimize debris falling through the opening after the tarp has been positioned about the object.

7. The landscaping tarp according to claim 1, wherein the first sheeting portion is resiliently biased so as to draw the opening toward a closed configuration.

8. The landscaping tarp according to claim 1, wherein the piece of sheeting is polymeric or copolymeric such that the tarp includes a slippery texture to minimize effort required to collect said debris.

9. The landscaping tarp according to claim 1, and further comprising a flap engaged to the piece of sheeting adjacent to the opening, with the flap being swingable to close off the opening when the piece of sheeting is positioned away from the object and to open up the opening when the piece of sheeting is positioned about the object.

10. The landscaping tarp according to claim 1, wherein the opening in the generally central area is fixed in a closed position via quick connectors.

11. A tarp for being positioned about an object comprising, in combination:
    a) a piece of sheeting, with the sheeting being flexible such that the sheeting can lay flat and be gathered into a bag form, with the piece of sheeting comprising first and second flexible sheeting portions, with the first and second sheeting portions being engaged to each other;
    b) wherein the first sheeting portion comprises a generally central area having a first opening for being positioned about the object, with the first opening being openable and closeable, with the first opening being resiliently biased toward a closed configuration to minimize debris falling through the opening when the tarp has been disengaged from the object;
    c) wherein the second sheeting portion is disposed about the first sheeting portion, with the second sheeting portion comprising a perimeter;
    d) wherein the first sheeting portion is extendable and retractable relative to the second sheeting portion whereby the first sheeting portion may give when placed about the object while permitting the second sheeting portion to lay flat; and e) wherein, when disengaged from the object and when the opening is closed, the tarp may be gathered about the perimeter to place the tarp in a bag form to hold the debris therein.

12. The tarp according to claim 11 wherein the first sheeting portion includes inner edges that overlap each other to further close the first opening.

13. The tarp according to claim 11 wherein the first sheeting portion includes inner edges that are engaged to each other via quick connectors to close off the first opening.

14. The tarp according to claim 11 and further comprising a second opening, with the second opening being formed in the second sheeting portion, with the first opening leading into the second opening and with the second opening being open at the perimeter to permit access from the perimeter to the generally central area.

15. The tarp according to claim 14 wherein sections of the second sheeting portion overlap each other to close off the second opening.

16. The tarp according to claim 14 wherein sections of the second sheeting portion are engaged to each other via quick connectors to close off the second opening.

17. The tarp according to claim 11 wherein the first and second sheeting portions are different colors.

18. A tarp for being positioned about an object comprising, in combination:

a) a piece of sheeting, with the sheeting being flexible such that the sheeting can lay flat and be gathered into a bag form, with the piece of sheeting comprising first and second sheeting portions, with the first and second sheeting portions being engaged to each other;

b) wherein the first sheeting portion comprises a generally central area having a first opening for being positioned about the object, with the first opening being openable and closeable, with the first opening being resiliently biased toward a closed configuration to minimize debris falling through the opening when the tarp has been disengaged from the object;

c) wherein the first sheeting portion includes inner edges that overlap each other to further close the first opening, with the inner edges of the first sheeting portion that overlap each other being quickly engagable and quickly disengagable to each other via quick connectors;

d) wherein the second sheeting portion is disposed about the first sheeting portion, with the second sheeting portion comprising a perimeter;

e) wherein the second sheeting portion further comprises a second opening, with the first opening leading into the second opening and with the second opening being open at the perimeter to permit access from the perimeter to the generally central area;

f) wherein sections of the second sheeting portion overlap each other to close off the second opening, with the sections of the second sheeting portion that overlap each other being quickly engagable and quickly disengagable to each other via quick connectors;

g) wherein the first sheeting portion is extendable and retractable relative to the second sheeting portion whereby the first sheeting portion may give when placed about the object while permitting the second sheeting portion to lay flat; and h) wherein, when disengaged from the object and when the opening is closed the tarp may be gathered about the perimeter to place the tarp in a bag form to hold the debris therein.

19. A landscaping tarp for landscaping an object set in an environment where collection of debris falling from the object is difficult, comprising, in combination:

a) a piece of sheeting, with the piece of sheeting having a perimeter and a generally central area within the perimeter, with the sheeting being flexible such that the sheeting can lay flat and be gathered into a bag form;

b) an opening in the generally central area, with the opening being openable and closeable;

c) wherein the opening and piece of sheeting are positioned about the object such that the debris falling from the object falls on the tarp instead of onto the environment;

d) wherein the opening is resiliently biased toward a closed configuration to minimize debris falling through the opening when the tarp is positioned about the object and when the tarp has been disengaged from the object; and e) wherein, when disengaged from the object, the sheeting may be gathered about the perimeter to place the sheeting in a bag form to hold the debris therein.

* * * * *